Oct. 29, 1957    S. G. ESKIN ET AL    2,811,312
COOLING SYSTEM THERMOSTATICALLY OPERATED VALVE
Filed April 8, 1955    2 Sheets—Sheet 1
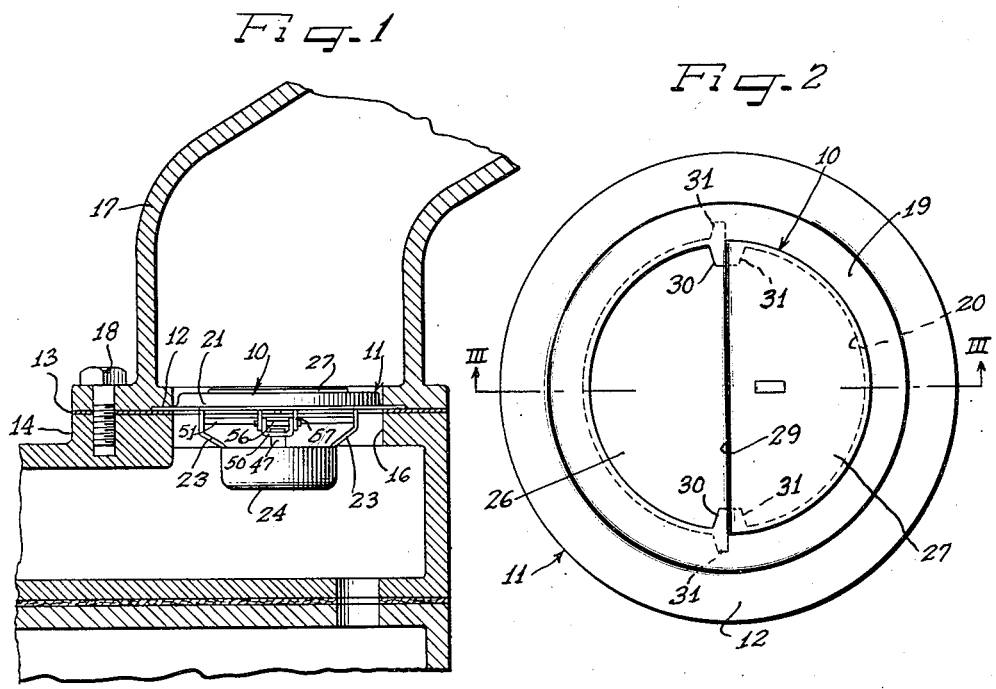
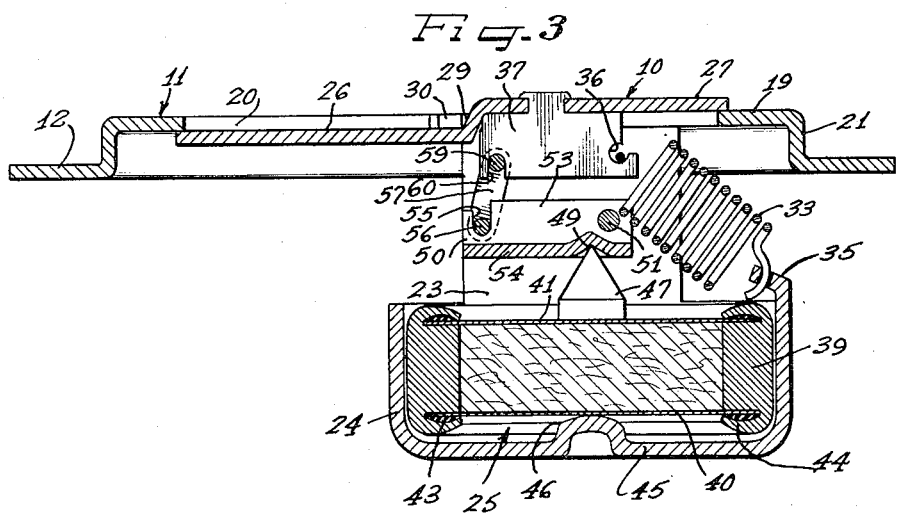
Inventors
SAMUEL G. ESKIN
THOMAS B. LEGEZA
by Hill, Sherman, Meroni, Gross & Simpson Attys.

Oct. 29, 1957 S. G. ESKIN ET AL 2,811,312
COOLING SYSTEM THERMOSTATICALLY OPERATED VALVE
Filed April 8, 1955 2 Sheets-Sheet 2
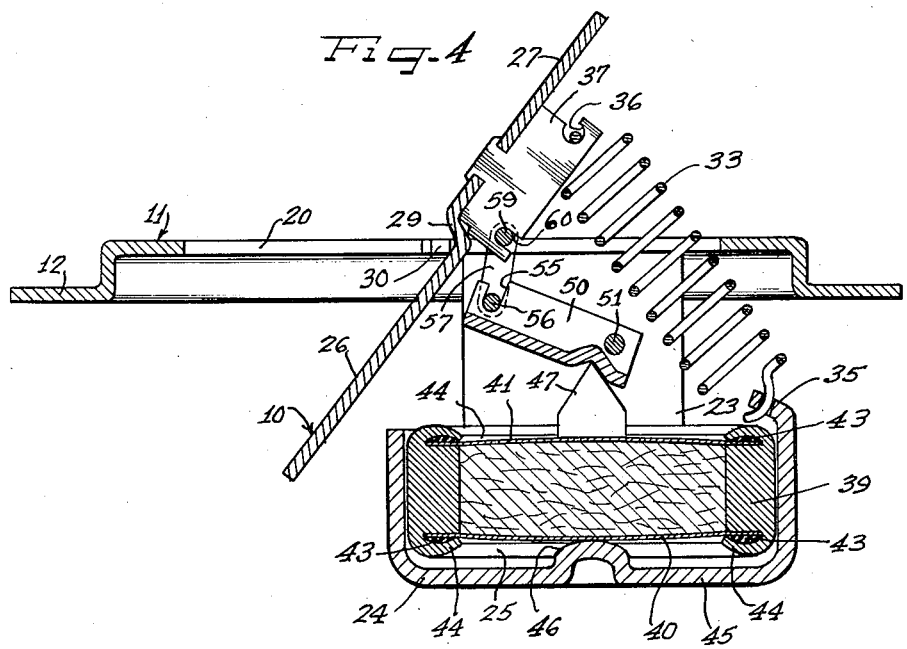
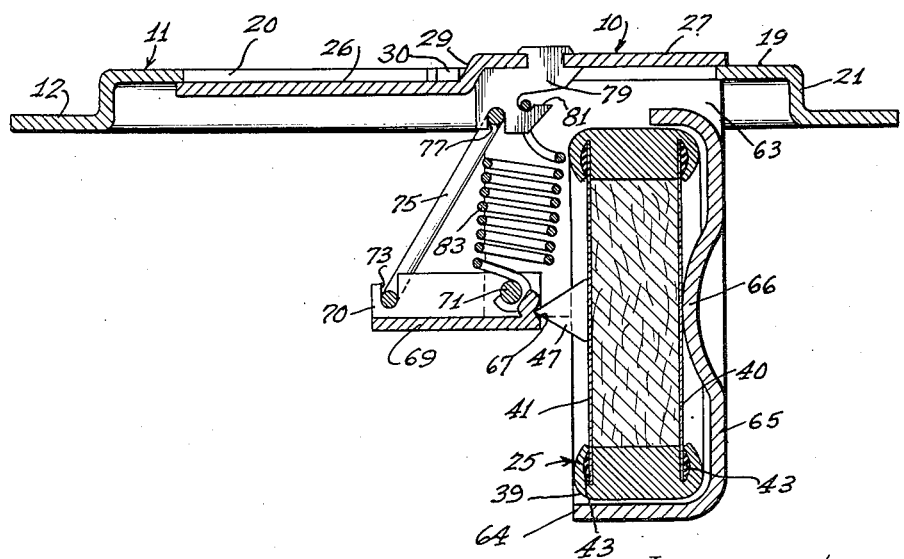
Inventors
Samuel G. Eskin
Thomas B. Legeza United States Patent Office 2,811,312
Patented Oct. 29, 1957

2,811,312

COOLING SYSTEM THERMOSTATICALLY OPERATED VALVE

Samuel G. Eskin, Chicago, and Thomas B. Legeza, Westchester, Ill., assignors to The Dole Valve Company, Chicago, Ill., a corporation of Illinois Application April 8, 1955, Serial No. 500,162

6 Claims. (Cl. 236—34)

This invention relates to improvements in thermostatically operated valves and more particularly relates to such valves as are used to control the coolant temperature of internal combustion engine cooling systems.

A principal object of our invention is to provide a simplified and improved form of thermostatically operated valve arranged with a view toward simplicity and accessibility of the valve and thermal element.

Still another object of our invention is to provide a thermostatic valve in which a butterfly valve is pivoted on a valve casing and a simplified form of positively acting thermostatic element carried in a retainer, reacts against a leverage arrangement for opening the valve against its spring-biased closed position upon a predetermined rise in temperature of the coolant.

Still another object of our invention is to provide a thermostatically operated valve particularly adapted for use in the cooling systems of internal combustion engines wherein the valve is positively opened by a simpler, more compact, and more inexpensive thermostatic element than has heretofore been provided for operating such valves.

A still further and important object of our invention is to provide a thermostatically operated valve for the cooling systems of internal combustion engines in which the valve pivots to control the flow of coolant through a port opening in the valve casing, and in which the valve casing has a cup-like retainer for the thermal element affording a positive reaction means for the thermal element and enabling the thermal element to be readily replaced to take care of different temperature conditions such as are encountered in summer and winter driving.

A still further object of our invention is to provide a thermostatically operated butterfly valve particularly adapted for use in cooling systems of internal combustion engines in which a disk-type power thermal element having oppositely acting expansible disks is carried in a retainer associated with the valve casing, and acts directly against a leverage means to pivot the valve to an open position upon predetermined rises in temperature.

These and other objects of our invention will appear from time to time as the following specification proceeds and with reference to the accompanying drawings wherein:

Figure 1 is a fragmentary vertical sectional view taken through the cylinder head and cooling conduit of an internal combustion engine, and showing a thermostatically operated valve constructed in accordance with our invention associated therewith for controlling the passage of cooling fluid through the cooling conduit;

Figure 2 is a top plan view of the valve shown in Figure 1;

Figure 3 is a sectional view taken substantially along line III—III of Figure 2;

Figure 4 is a view somewhat similar to Figure 3 but showing the valve in its extreme open position; and Figure 5 is a transverse sectional view taken through a modified form of thermostatic valve constructed in accordance with our invention.

In the embodiment of our invention illustrated in the drawings, we have shown in Figure 1 a thermostatically operated valve 10 of the pivoted butterfly type having a flanged casing 11 positioned in the cylinder head of an internal combustion engine. A flange 12 of the flanged valve casing 11 abuts a gasket 13 on a cylinder head 14 of an internal combustion engine. The casing 11 is positioned within an outlet port 16 in the cylinder head which has communication with the water jacket therein, to control the passage of cooling fluid through an outlet fitting or conduit 17. The fitting 17 may be secured to the cylinder head in engagement with the top surface of the flange 12 and the gasket 13 by cap screws 18.

The casing 11 may be made from a metallic stamping, stamped from a sheet or plate of brass or any other suitable material which is unaffected by the coolant and lends itself to a large scale commercial production.

The casing 11 is shown in Figures 2 and 3 as having a flat annular portion 19, the inner margin of which defines a valve or port opening 20. The casing 11 also has an outer annular wall 21 extending perpendicularly to the flange 12 and connecting the flange 12 with the flat annular portion 19 of said casing. Spaced straps 23 extending inwardly from the inner or upstream surface of the annular portion 19 form a support for a cup-like seat or retainer 24 for a thermal element 25, the open portion of which faces the valve 10.

The valve 10 may likewise be made from a metallic stamping of a type which may be economically manufactured in suitable press equipment and includes two laterally offset semi-circular wing portions 26 and 27, joined together by an intermediate spacer section 29 and engaging the bottom and top surfaces of the annular portion 19 respectively, when the valve is closed.

The height of the intermediate spacer section 29 is determined by the thickness of the annular portion 19 of the valve casing 11 to space the wing portion 26 on the underside of the annular flat portion 19 of the valve casing 11 and space the wing portion 27 on the topside of the annular flat portion 19 of the casing 11 when the valve is closed.

Two spaced ears 30 spaced apart a distance sufficient to receive the intermediate spacer section 29 are herein shown as extending inwardly of the margin of the port opening 20 in the casing 11 from opposite sides thereof. The space between said ears form diametrically opposed slots to receive the intermediate spacer portion 29 of the valve 10 and form a pivot therefor.

The valve 10 is also shown as having two ears 31 extending outwardly from the wing portion 26 in diametrically opposed relation with respect to each other beyond the port opening 20 and abutting the bottom of the flat annular portion 19 of the valve casing to retain the valve to said casing in its open position.

A spring 33 is provided to bias the valve 10 in a closed position. The spring 33 is hooked at one end to an ear 35 extending upwardly and inwardly from the wall of the cup-like retainer 24 and is hooked at its opposite end within an outwardly opening apertured portion 36 of an ear or connector 37. The connector 37 is riveted or otherwise secured to the wing portion 27 of the valve 10 and extends outwardly therealong from the inner end of the intermediate spacer portion 29 at generally right angles with respect thereto, for a portion of the length of the wing portion 27.

The thermal element 25 may be of a form similar to that shown and described in application Serial No. 399,947, filed by Samuel G. Eskin on December 23, 1953 and entitled "Thermal Responsive Unit." This thermal element is shown as having a generally cylindrical casing 39, the opposite ends of which are sealed by metallic diaphragms or disks 40 and 41. The disks 40 and 41 are sealed to shouldered end portions of the casing 39 by gaskets 43. The gaskets 43 are maintained in sealing engagement with said diaphragms by reduced cross-sectional area wall portions 44 of the cylinder 39 which may be spun over said gaskets as in the aforementioned prior application Serial No. 399,947.

The cup-like retainer 24 for the thermal element 25 has a bottom wall 45 having a central inwardly projecting bearing portion 46 indented from the outer side thereof and having engagement with the metal diaphragm 40 of the thermal element 25 at the axial center thereof and forming a reaction member therefor and accommodating limited rocking movement of said thermal element with respect to the receptacle or retainer 24.

The metallic diaphragm 41 has a knife edge fulcrum or reaction member 47 welded or otherwise secured thereto at the center thereof and projecting outwardly therefrom to come into bearing engagement with a recessed portion 49 of an amplifying lever 50, pivoted on a pivot pin 51 extending transversely of the diaphragm 41 in radial spaced relation with respect to the point of the knife edge fulcrum 47. The pin 51 in turn is secured to the straps or spacers 23 at its ends. The return spring 33 serves not only to bias the valve to its closed position but also to retain the knife edge in engagement with the recess 49 and to retain the thermal element within its receptacle 24.

It is understood from application Serial No. 399,947 that the metallic diaphragms 40 and 41 retain a thermally expansible material within the casing 39, which may be, by way of example, a metallic wool, such as a copper or aluminum wool, having a fusible material filling the spaces therebetween and expansible on fusion, and being fusible in the operating range of the device. The fusible material may be either a paraffin or microcrystalline wax. Other thermally expansible materials may be a material such as is shown and described in United States Letters Patent No. 2,259,846 in which a wax, a powdered metal heat-conducting material and a binder are bound together by the binder into a solid fusible body.

The amplifying lever 50 is shown as being of a generally channel like form having parallel spaced side walls 53 through which the pivot pin 51 extends, and having an intermediate portion 54 thereof having the recess 49 in the under side thereof. The walls 53 are shown as having aligned upwardly opening slots 55 therein for receiving a transverse pin 56 of a link 57. The link 57 is also shown as having a transverse pin 59 at its end opposite the pin 56, fitting within a downwardly opening slot 60 in the ear or connector 37.

When the coolant passing over the thermal element 25 becomes sufficiently hot to fuse the thermally expansible material of said thermal element, the diaphragms 40 and 41 will both move into extended positions with respect to the casing 39, the diaphragm 40 reacting against the projection 46 and the diaphragm 41 moving the knife edge fulcrum 47 to pivot the amplifying lever 50 in a clockwise direction and pivot the valve 10 in a counterclockwise direction through the link 57, connecting said lever with said valve, and moving the valve to the open position shown in Figure 4.

Upon predetermined reductions in temperature of the coolant, the spring 33 will return the valve 10 to its closed position and when doing this, the link 57 will move the lever 50 in a counterclockwise direction, reacting against the knife edge pivot 47 to retractably move the disks 40 and 41 into the positions shown in Figure 3.

The valve and thermal element shown in Figure 5 are like those shown in Figures 1 through 4 except that the thermal element has been positioned vertically with respect to the valve casing to reduce the obstruction to the flow of water through the port opening 20 thereof. Parts like those shown in Figures 1 through 4 will therefor be designated by the same reference characters as were used in Figures 1 through 4, new reference characters only being applied to the new parts.

In this form of our invention, parallel spaced spacer straps 63, extending from the inside of the annular flat portion 19 of the valve casing 11 have a vertically extending cup-like retainer 64 formed as a part thereof for carrying the thermal element 25. The retainer 64 has a vertically extending outer wall portion 65 having an inwardly pressed indentation 66 therein, the projecting portion of which is adapted to engage the disk 40 of the thermal element 25 and form a rocking abutment therefor. The knife edge pivot 47 on the disk 41 is shown as engaging a recessed portion 67 of an amplifying lever 69 extending at right angles thereto and spaced beneath and radially outwardly from a pivot pin 71 for said lever. The amplifying lever 69 is of a generally channel-shaped form having parallel spaced side walls 70 mounted on the transverse pivot pin 71. The pin 71 is mounted at its ends in the spacer straps 63. The parallel spaced side walls 70 of the amplifying lever 69 each have an upwardly opening slot 73 therein, adjacent the outer end thereof. The slots 73 are pivotally engaged by a link 75. The opposite end of the link 75 is engaged within a downwardly opening slot 77 in an ear 79 riveted or otherwise secured to the wing portion 27 of the valve 10 and depending therefrom, like the ear 37 in the form of our invention shown in Figures 3 and 4. The ear 79 has an outwardly opening slot 81 spaced outwardly from the pivot of the valve 10 and having a tension spring 83 hooked therein at one end. The opposite end of the tension spring 83 is hooked around the pin 71. The tension spring 83 thus serves to move the valve 10 to a closed position and to retract the disks 40 and 41 of the thermal element 25 as in the form of our invention shown in Figures 1 through 4.

The point of engagement of the knife edge of the knife edge fulcrum 47 with the recess 67 is spaced downwardly and radially outwardly from the axis of the pivot pin 71 a distance sufficient to provide sufficient leverage to positively pivot the amplifying lever 69 in a clockwise valve opening direction upon expansion of the thermally expansible material contained within the casing 39 by the disks 40 and 41, to effect opening of the valve in an obvious manner.

It may be seen from the foregoing that in both forms of our invention disclosed herein, that we have provided an extremely simple form of thermostatic valve utilizing a disk-type of thermal element and have so arranged the valve and container for the thermal element, that the thermal element requires no securing means for securing it to its retainer and may be placed within its retainer prior to connecting the return spring for the valve and may readily be removed from the retainer merely by disconnecting the return spring from the valve.

The thermal elements may thus be readily replaced as when it is desired to use a thermal element having a relatively low temperature range of operation for summer driving and to replace this thermal element with a thermal element having a relatively high temperature range of operation for winter driving, it being understood that the temperature range of operation of the thermal element may be varied by the use of different forms of thermally expansible fusible materials.

It will be understood that modifications and variations in the present invention may be effected without departing from the spirit and scope of the novel concepts thereof.

We claim as our invention:

1. In a thermostatic valve, a valve casing having a port opening, a valve pivotally carried by said casing for closing said port opening, a spring biasing said valve into position to close said port opening, an amplifying lever pivoted to said casing for movement about an axis parallel to the axis of movement of said valve, a link pivotally connecting said lever with said valve to pivot said valve in a valve opening direction upon pivotal movement of said lever arm in one direction, a thermal element loosely carried by said valve casing for slidable movement with respect thereto and having a casing, spaced inner and outer expansible disks closing said casing and a thermally expansible fusible material contained within said casing between said disks, one disk having bearing engagement with said valve casing and the other disk having a knife edge reaction member projecting therefrom having engagement with said lever at a point spaced from the pivot thereof toward the pivot of said valve, to open said valve upon predetermined increases in temperature to the fusion range of the fusible material within said casing.

2. In a thermostatic valve, a valve casing having a port opening leading therethrough, a butterfly valve pivotally supported on said casing for controlling the flow of fluid through said port opening, a receptacle carried by said casing in spaced relation with respect to said valve and opening toward said valve, an amplifying lever pivoted to said casing between said receptacle and said port opening for movement about an axis parallel to the pivotal axis of said valve and spaced radially and inwardly therefrom, a link connecting said lever with said valve to pivotally move said valve in a direction opposite to the movement of said lever arm, to open said valve upon movement of said lever arm in a valve opening direction, a thermal element loosely carried in said receptacle for slidable movement with respect thereto and reacting against said receptacle and having a casing containing a fusible thermally expansible material and having a flexible diaphragm closing said casing and facing said valve and having a knife edge reaction member projecting therefrom, an engaging connection between said reaction member and amplifying lever at a point spaced radially from the pivotal axis thereof, for pivoting said lever to open said valve upon extensible movement of said diaphragm with respect to said casing upon predetermined increases in temperature, and means retaining said thermal element to said receptacle comprising a return spring connected with said valve.

3. In a thermostatic valve, a valve casing having a port opening leading therethrough, a butterfly valve pivotally supported by said valve casing for controlling the flow of fluid through said port opening, a cup-like receptacle carried by said valve casing and having a closed end, having a cylindrical wall extending therefrom opening toward said valve and port opening, an amplifying lever pivoted to said valve casing in spaced relation with respect to the pivotal axis of said valve, a link connecting said lever arm to said valve to move the same in a valve opening direction upon pivotal movement of said lever arm in one direction, a thermostatic element loosely carried by said receptacle for movement along the wall thereof upon increases in temperature and including a casing containing a thermally expansible material and spaced flexible metal diaphragms closing opposite ends of said casing, one of said diaphragms reacting against the bottom of said receptacle, a reaction member projecting from the other of said diaphragms and having a knife edge reaction point having bearing engagement with said lever to pivot the same in a valve opening direction upon extensible movement of said disks with respect to said element casing upon predetermined rises in temperature, and a spring connected between said receptacle and valve for retaining said thermal element to said receptacle and closing said valve upon predetermined reductions in temperature.

4. In a thermostatic valve, a valve casing having a port opening leading therethrough, a butterfly valve pivotally supported on said casing for controlling the flow of fluid through said port opening, a receptacle connected to said casing on the upstream side of said port opening and extending generally perpendicular to said port opening and disposed to one side thereof and opening in the direction of the flow of fluid through said port opening, a thermal element loosely carried in said receptacle and reacting thereagainst and including a casing having a flexible metal diaphragm containing a thermally expansible material therein and having a knife edge fulcrum projecting therefrom, an amplifying leverage arrangement operatively engaged by said knife edge fulcrum for opening said valve upon predetermined increases in temperature, and a return spring for said valve maintaining said leverage arrangement in engagement with said fulcrum and said thermal element within said receptacle.

5. In a thermostatic valve, a valve casing having a port opening leading therethrough, a butterfly valve pivotally supported on said valve casing for controlling the flow of fluid through said port opening, a receptacle connected to said valve casing on the upstream side of said port opening and extending at generally right angles with respect to said port opening and disposed to one side thereof, a pivot shaft carried by said casing in spaced relation with respect to said port opening on the upstream side thereof, an amplifying lever pivoted on said shaft, a link connecting the free end of said lever with said valve to operate the same upon pivotal movement of said lever in one direction, a spring connected between said pivot shaft and valve for biasing the same into a closed position, a thermostatic element loosely carried by said receptacle and including an element casing containing a fusible thermally expansible material and spaced flexible metal diaphragms closing opposite ends of said element casing, one of said diaphragms having rocking engagement with said receptacle and the other of said diaphragms having a knife edge fulcrum thereon having bearing engagement with said amplifying lever for pivoting the same in a valve opening direction upon extension of said diaphragms with respect to said element casing effected by fusion of the fusible thermally expansible material contained therein upon predetermined rises in temperature.

6. In a thermostatic valve, a valve casing having a port opening leading therethrough, a butterfly valve pivotally supported on said casing for controlling the flow of fluid through said port opening, spacer straps extending from said casing at one side of said port opening, a cup-like receptacle carried between said straps and facing in a direction at right angles to said port opening and spaced to one side of the axis of pivotal movement of said butterfly valve, said receptacle having a rocking bearing projection extending therein, a pivot shaft carried on said spacer straps parallel to the axis of said valve and spaced therefrom in a radial and upstream direction, an amplifying lever pivoted on said shaft and extending therefrom, a link connecting said lever with said valve, said lever having a recessed portion therein facing said receptacle and spaced radially outwardly and downwardly from the axis of said pivot shaft, a thermostatic element loosely carried by said receptacle and including an element casing containing a thermally expansible material and spaced flexible metal diaphragms closing opposite ends of said element casing, one of said diaphragms having rocking engagement with said bearing projection, a knife edge fulcrum secured to and projecting from the other of said diaphragms and having a knife edge having operative engagement with said recessed portion of said lever, and a return spring for said valve having connection therewith and maintaining said thermal element within said receptacle and said fulcrum in engagement with said recessed portion.

References Cited in the file of this patent

UNITED STATES PATENTS

| | | |
|---|---|---|
| 1,153,214 | Fulton | Sept. 14, 1915 |
| 1,542,088 | Post | June 16, 1925 |
| 1,607,745 | Palm | Nov. 23, 1926 |
| 1,927,036 | Johnson | Sept. 19, 1933 |
| 1,991,392 | Jorgensen | Feb. 19, 1935 |
| 2,070,751 | Riechel | Feb. 16, 1937 |
| 2,565,713 | Allen | Aug. 28, 1951 |
| 2,710,146 | Drapeau | June 7, 1955 |
| 2,742,051 | Chanda | Apr. 17, 1956 |

FOREIGN PATENTS

| | | |
|---|---|---|
| 37,830 | Denmark | Aug. 9, 1927 |
| 327,978 | Great Britain | Apr. 14, 1930 |